United States Patent [19]
Durheim

[11] Patent Number: 5,304,774
[45] Date of Patent: Apr. 19, 1994

[54] METHOD AND APPARATUS FOR MONITORING WELD QUALITY

[75] Inventor: Brent A. Durheim, Peoria, Ill.

[73] Assignee: Caterpillar, Inc., Peoria, Ill.

[21] Appl. No.: 62,266

[22] Filed: May 17, 1993

[51] Int. Cl.$^5$ ............................................ B23K 26/02
[52] U.S. Cl. ............................. 219/121.83; 219/121.63
[58] Field of Search ..................... 219/121.63, 121.64, 219/121.83

[56] References Cited

U.S. PATENT DOCUMENTS

| | | | |
|---|---|---|---|
| 3,485,996 | 12/1969 | Chiou et al. | 219/121.63 |
| 4,007,631 | 2/1977 | Saifi et al. | 219/121.64 X |
| 4,711,986 | 12/1987 | Lillquist et al. | 219/130.01 |
| 4,939,336 | 7/1990 | Meyer et al. | 219/121.62 |
| 5,041,714 | 8/1991 | Funk | 219/121.62 |
| 5,155,329 | 10/1992 | Terada et al. | 219/121.83 |

*Primary Examiner*—C. L. Albritton
*Attorney, Agent, or Firm*—Joseph W. Keen

[57] ABSTRACT

A method for monitoring welding of a workpiece includes selecting light of a predetermined wavelength from that emitted by plasma produced by the welding process, generating signals indicative of the selected light's intensity, and correlating those signals with the cross-sectional area of the weld. An apparatus for monitoring welding of a workpiece includes a filter for passing selected light of a predetermined wavelength emitted by plasma, a signal generator which produces signals indicative of the intensity of the selected light, and means for correlating the signals with the weld's cross-sectional area.

11 Claims, 2 Drawing Sheets

METHOD AND APPARATUS FOR MONITORING WELD QUALITY

TECHNICAL FIELD

This invention relates to method and apparatus for monitoring weld quality and, more particularly, to determining the cross-sectional area of a weld as a result of measuring the intensity of a predetermined wavelength of light emitted from plasma produced by the welding process.

BACKGROUND ART

Since the laser's inception, it has gained increasing acceptance in the industrial market as being a manufacturing tool that can increase efficiency and improve quality. The laser's increasing acceptance is due, in large part, to: its noncontact operational characteristic which eliminates costly fixturing; its easy automation and integration into manufacturing processes; its potential for greatly reducing process times; and its ability to access remote locations and be shared by several workstations for multiple processing. High power lasers are now being used in industry for a number of manufacturing applications including boring, cutting, welding, heat treating, and general machining.

Weld quality is a primary concern in industrial laser welding processes. Since many process variables can influence the quality of a laser weld (such as power, frequency, weld speed, focal length, position, workpiece composition, joint fit up, and shield gas), it is necessary to be able to determine the penetration of the weld independent of such process variables. Penetration of a weld is, probably, the single most important indicia of weld quality with a measure of same being required to permit adjustment of the process variables. By using appropriate process controls in which one or more of the aforementioned process variables are adjusted, the quality of the weld may be maintained within predetermined limits. The welding process can be monitored and controlled effectively if at least one measurable output can be related to the physical process of welding. Many process monitoring devices have been used for laser weld processed materials without notable success.

A method and apparatus for monitoring laser beam welding, illustrated in U.S. Pat. No. 5,155,329 issued Oct. 13, 1992, generally involves monitoring the intensity of light of predetermined wavelength emanating from a workpiece immediately before there is a rise in the intensity of an associated pulsating laser beam and correlating the emanating minimum light intensity with the depth of penetration of the laser weld zone. Since the weld depth of penetration is correlatable with the minimum intensity of emanating light prior to a rise in the intensity of the pulsating laser beam, the pulsating laser beam's intensity must be monitored as well as the emanating light intensity of the predetermined wave length. Accordingly, such method and apparatus involve a degree of complexity which is undesirable.

The present invention is directed to overcoming one or more of the problems set forth above.

DISCLOSURE OF THE INVENTION

In one aspect of the present invention, a method of monitoring a weld process is provided which includes selecting light of a predetermined wavelength emitted from plasma located adjacent a workpiece, generating signals indicative of the selected light's intensity, and correlating those signals with the cross-sectional area of the weld. In another aspect of the present invention an apparatus for monitoring welding of a workpiece includes a filter for selecting light of a predetermined wavelength from that emitted from plasma during welding of a workpiece, a photodiode or other signal generator for producing signals indicative of the intensity of the selected light, and means for correlating the signals with the weld's cross-sectional area.

BEST MODE FOR CARRYING OUT THE INVENTION

Figure 1:
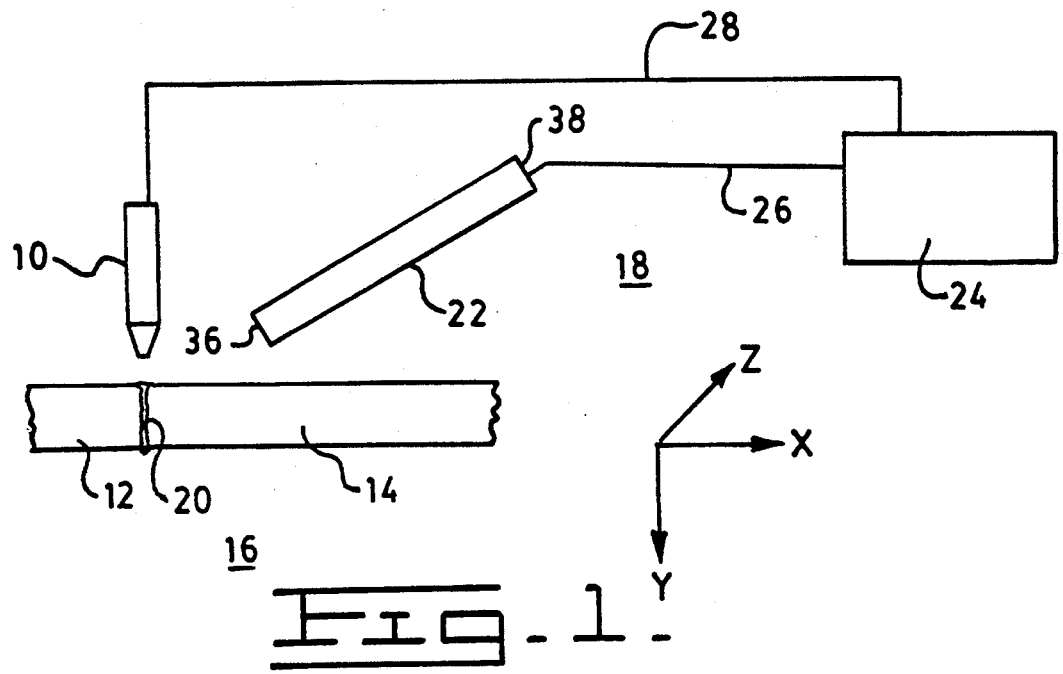
FIG. 1 is a schematic diagram of an embodiment of a laser beam monitoring system according to the present invention.

FIG. 1 illustrates a laser welding apparatus 10 disposed in schematic operational position adjacent a pair of subworkpieces 12 and 14 which, after they are welded, comprise workpiece 16, and a weld monitoring apparatus 18. The welding apparatus 10 preferably constitutes a high power laser whose output is sufficient to weld the workpiece 16. Details of the welding apparatus 10 are not relevant for purposes of the present invention but it is believed that the present invention may function with facility in cooperation with conventional, nonlaser welding apparatus. the subworkpiece 12 and subworkpiece 14 are, preparatory to welding, conventionally "fit up" and fixtured in place. A welding zone 20 of the workpiece 16 (between subworkpieces 12,14) will desirably be through the entire depth thereof to ensure continuity and full strength after welding. It is to be understood that the workpiece 16, as exemplified, extends, in the illustrated Z direction, away from the viewer and that the welding apparatus 10 operationally, moves generally in such Z direction relative to the workpiece 16. Accordingly, welding speeds described herein are to be understood as being measured in such Z direction and reference to weld location is to be understood to mean location in such Z direction.

Monitoring apparatus 18 generally includes a sensor apparatus 22 and a control apparatus 24 which is electrically connected to the sensor apparatus 22 by one or more conductors 26 and to welding apparatus 10 by one or more conductors 28. Control apparatus 24 preferably constitutes a processor which may be used to control the welding apparatus' speed, power output, and position relative to the workpiece 16 but will be discussed in detail herein only in conjunction with its electrical interconnection with sensor apparatus 22. Although the sensor apparatus 22 is illustrated and discussed herein as being operationally disposed in close proximity to the welding zone 20, it may, depending on a number of factors, be more desirable to locate the sensor apparatus 22 in a remote location relative to the welding zone 20 and connect fiber optic bundle(s) such that they convey plasma emitted light from the welding zone 20 to the sensor apparatus 22.

Figure 2:
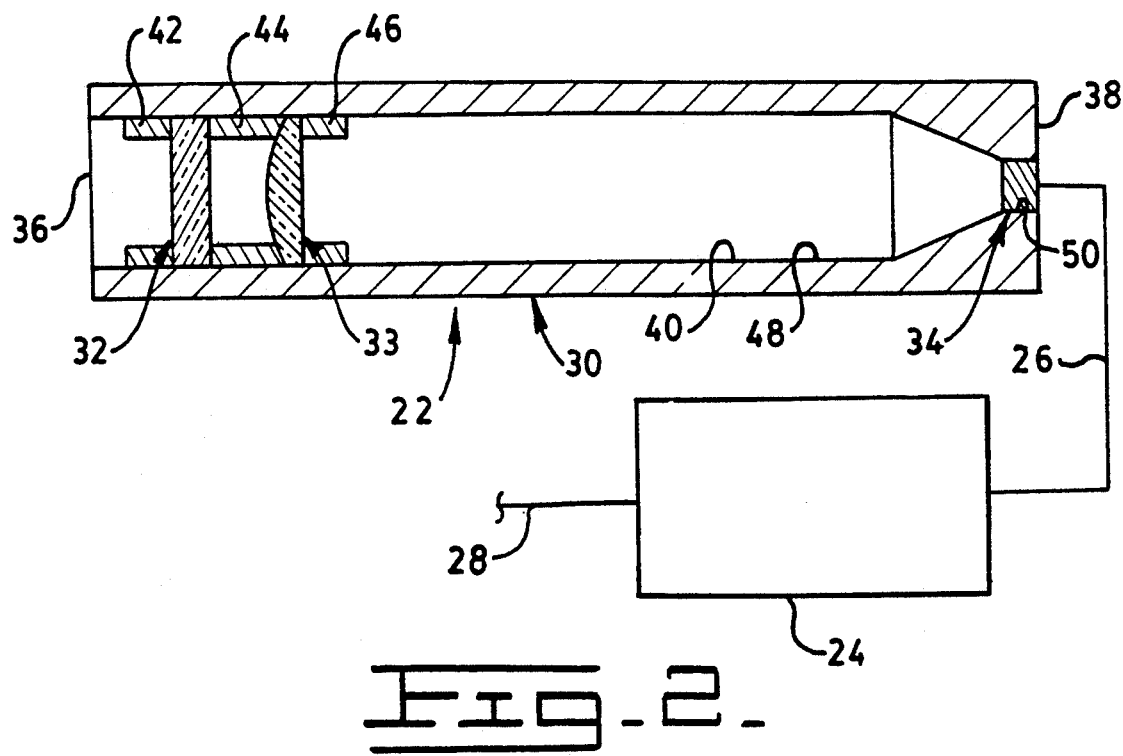
FIG. 2 is a combination schematic diagram and sectional view of the monitoring system of the present invention.

Welding sensor apparatus 22, better shown in FIG. 2, generally includes: a sensor housing 30 which is, desirably, tubular in shape; a narrow band pass optical filter 32 of 3nm; and a photodiode 34. Weld sensor 22 has a light receptor end 36 which, as best seen in FIG. 1, is operationally disposed relatively near the weld region 20 and a signal end 38 which is operationally disposed relatively remotely from the weld region 20. Housing 30 has an inside surface 40 which surrounds filter 32, lens 33, and photodiode 34. A set of spacer/locators 42,44 and 46 engage with the sensor housing's inside surface 40 and, respectively, with the filter 32, the filter 32 and lens 33, and lens 33 to fix same in position within housing 30 during operation of the weld monitor system 18. The inside surface 40 generally converges from a relatively large diameter 48 to a relatively small diameter 50 which diameters are respectively disposed at the light receptor end 36 and the signal end 38. Photodiode 34 is housed in the small diameter 50 of the inside surface 40 in any conventional manner.

Filter 32 was selected to eliminate the light of all atomic transition lines except that for FE(I)452.861nm emitted from plasma and other sources adjacent the workpiece 16. That atomic transition line was selected because: it gave good separation from other atomic transition wavelengths; it had high intensity relative to other atomic transition lines; had high probability for the electron shell jump (Einstein coefficient); and most materials to be welded have a predominant FE constituent. For the illustrated embodiment lens 33 has a focal length of 150 mm and the photodiode 50 has low noise characteristics and a large active area. It is to be understood that lens 33 could be eliminated if a photodiode having a larger active area than the illustrated photodiode 50 were used.

INDUSTRIAL APPLICABILITY

With reference to the drawings, light emitted from plasma residing in the vicinity of the weld zone 20 traveling toward weld sensor 22 first encounters the filter 32 which passes only the selected wavelength light which, in this case, is 452.861nm. The passed light subsequently encounters lens 33 which focuses same on the photodiode 50 which generates a current whose magnitude is a function of the impinging light intensity. The current signal generated by the photodiode is transmitted via conductors 26 to control apparatus 24 which correlates the signal with the cross-sectional area of the weld.

While the weld cross-sectional shape may vary with a variety of parameters such as the workpiece material, the direction of the weld beam relative to the workpiece 16, and the weld or travel speed of the welding apparatus 10, one can determine the mathematical shape of the weld cross-section. By thereafter measuring the width of the weld (X direction) at a minimum of one vertical location (Y direction) within the weld, one can calculate the penetration depth (in the Y direction) and use same as an indicia of the weld quality. For example, many laser welding applications have a weld cross-sectional area which is triangular in shape (in a plane defined by X and Y directions) with the triangle's base being at the workpiece surface adjacent the welding apparatus 10. Accordingly, if one measures the weld width (W) at the workpiece surface adjacent welder 10 and determines the cross-sectional area (A) of the weld at that location (in the Z direction) through the use of the weld monitor apparatus 18, the penetration depth of the weld (P) can be determined by using the equation $P = 2A/W$. While the penetration depth P may be measured subsequent to the welding operation by any one of a variety of measuring techniques, incorporation of the aforementioned calculation by the controller apparatus 24 would be very straightforward and could be used, for example, to adjust the parameters of the welder 10 to maintain the penetration depth within desired limits. The details of such control method are, however, outside the scope of the present invention and will not be described herein.

It is to be understood that the light intensity/weld cross-sectional area correlation must be empirically determined by measuring the intensity of the selected wavelength light at various locations along the weld region 20 in the Z direction, subsequently measuring the cross-sectional area in the XY plane at those Z direction locations, and developing the prescribed correlation. It is to be also understood that the correlation must be developed for each combination of travel speed of the welder 10 and focal position of the laser. Accordingly, for a given laser power, welder travel speed, laser focal position, and workpiece material, the cross-sectional area of the weld is correlatable with the plasma-emitting light intensity of a single atomic transition line. While the light wavelength selected herein is believed optimal, it is to be understood that other light wavelengths may be used in the claimed invention with equal facility.

Figure 3A:
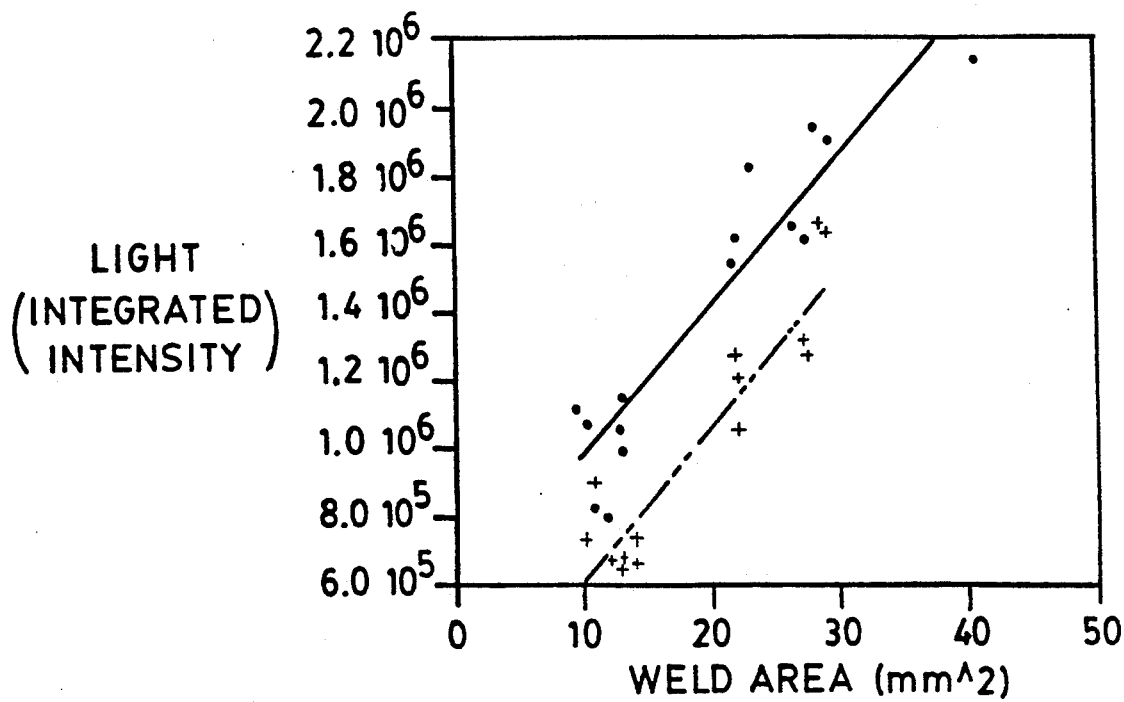
FIGS. 3A and 3B are plots of Weld Area vs. Integrated Light Intensity for welding speeds of 60 and 20 inches per minute, respectively.
Figure 3B:
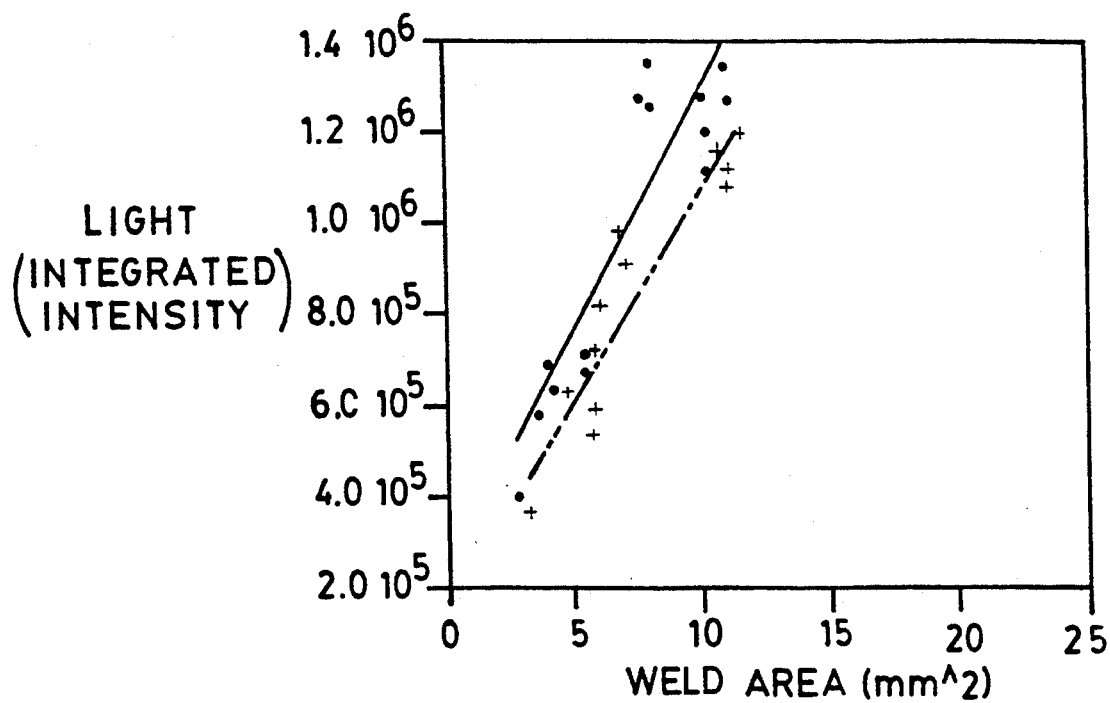

FIGS. 3A and 3B illustrate the curve fits and, thus, the correlation between the intensity of plasma emitting light and the cross-sectional area of a laser weld; for weld travel speeds of 60 inches per minute and 20 inches per minute, respectively. FIGS. 3A and 3B each have a solid (———) and an intermittent (——···——) plot which correspond, respectively, to laser focal position 2 mm below and above the top surface (as viewed in FIG. 1) of workpiece 16 and which are respectively associated with data points represented by "•" and "+". The laser welder apparatus 10 was, for FIGS. 3A and 3B, operated at powers of 3KW and 5KW, and SAE1018 steel and SAE15B22 comprised the workpiece 16. As can be seen from inspection of FIGS. 3A and 3B, the desired correlation between integrated light intensity and weld area obtains for a given weld travel speed independent of the laser's focal position. For example, for a 60 inch per minute weld travel speed, the weld area of 20mm$^2$ corresponds with: a light intensity of $1.4 \times 10$ for a laser focal position of 2 mm below the top surface; and a light intensity of $1.05 \times 10^6$ for a laser focal position of 2 mm above the workpiece's top surface. Such correlation was also independent of laser power and workpiece material.

It should now be apparent that a variety of weld quality parameters may be monitored by measuring the intensity of an atomic transition line of light emitted from plasma excited by the welder's input energy and correlating same with the resultant weld's cross-sectional area. While certain preferred componentry has been described herein in conjunction with the present invention, it is to be understood that other apparatus may be substituted therefor while remaining within the purview of the present invention.

I claim:

1. A method of monitoring welding of a workpiece comprising:

during welding, selecting light of a predetermined wavelength emitted from plasma at a desired location adjacent the workpiece;

generating signals indicative of the intensity of the selected light; and correlating said signals with the cross-sectional area of the weld at the desired location.

2. The method of claim 1, said selecting comprising:
obstructing light emitted from the plasma except for light of said predetermined wavelength.

3. The method of claim 1 further comprising:
measuring the width of the weld at the desired weld location;
calculating the weld's penetration distance at the desired weld location using the formula $P = 2A/W$
where $P$ = weld penetration distance
$A$ = weld cross-sectional area at desired location
$W$ = weld width at desired weld location.

4. The method of claim 1, said light selection being performed at a constant distance from each desired weld location.

5. The method of claim 1, further comprising:
focusing the selected light prior to generating the signals.

6. Apparatus for monitoring welding of a workpiece comprising:

means for obstructing light emitted from plasma at a desired weld location adjacent the workpiece other than selected light of a predetermined wavelength;
means for generating signals indicative of the intensity of the selected light; and
means for correlating the signals with the weld's cross-sectional area at the desired weld location.

7. The apparatus of claim 6 further comprising:
means for calculating the weld's penetration at the desired weld location using the formula $P = 2A/W$
where $P$ = weld penetration
$A$ = weld cross-sectional area at desired weld location
$W$ = weld width at desired weld location 8. The apparatus of claim 6 further comprising:
means for maintaining said light obstructing means at a predetermined distance from each weld location.

9. The apparatus of claim 7, further comprising:
means for welding the workpiece; and
means for controlling said welding means to maintain the weld's penetration within a selected range.

10. The apparatus of claim 6, said signal generating means comprising: a photodiode.

11. The apparatus of claim 10, further comprising:
a lens for focusing the selected light on said photodiode.

* * * * *